United States Patent
Levoin

[15] 3,698,119
[45] Oct. 17, 1972

[54] FISHING TACKLE
[72] Inventor: Francis Jean Henri Raymond Levoin, Lugano, Switzerland
[73] Assignee: Carpano & Pans S.A. Boite Postale, Cluses, France
[22] Filed: Aug. 21, 1970
[21] Appl. No.: 65,966

[30] Foreign Application Priority Data

June 4, 1970 Switzerland.............8513/70
Aug. 18, 1969 Switzerland............12575/69

[52] U.S. Cl..................................43/42.08, 43/44.86
[51] Int. Cl..............................................A01k 85/00
[58] Field of Search...................43/42.08, 42.36

[56] References Cited
UNITED STATES PATENTS 2,214,668  9/1940  Erickson...............43/42.08
3,417,503  12/1968  Meulnart...............43/42.08

FOREIGN PATENTS OR APPLICATIONS 87,503  5/1956  Norway................43/42.08
194,688  2/1965  Sweden...............43/42.36

Primary Examiner—Samuel Koren
Assistant Examiner—George M. Yahwak
Attorney—Robert E. Burns and Emmanuel J. Lobato

[57] ABSTRACT

An artificial bait for fish includes a body having a cavity for receiving a looped portion of a resilient pin. The loop releasably supports a hook and at the extremity of one free end of the pin forming part of the loop, has an outwardly formed part which engages a surface of a ledge formed in the cavity to resiliently resist movement of the pin away from the body. The ledge is formed by the junction of a hole formed in the body laterally of, and communicating with, the cavity.

8 Claims, 4 Drawing Figures

3,698,119

FISHING TACKLE

BACKGROUND OF THE INVENTION.

This invention relates to fishing tackle, and in particular, to artificial baits. Various types of fish hooks are known, for example, single, double or triple hooks each having rings of various sizes suitable for catching different types of fish. The fisherman using an artificial bait is often obliged to attach different fish hooks to the artificial bait at frequent intervals of time. Known artificial baits are relatively complicated and require the use of a tool for changing the hook.

AIM OF THE INVENTION.

An object of the present invention is the provision of an artificial bait for fish which permits the rapid changing of hooks without recourse to any tools, by a simple operation.

According to one aspect of the present invention, an artificial bait for fish comprises a body having a cavity extending into the body from a surface of the body, a ledge formed in said cavity and having a surface facing generally inwardly of the cavity, and a pin of resilient material formed with a closed loop at one end for releasably supporting a hook, the one end, at its extremity, having an outwardly formed part, the loop being resiliently received in the cavity such that the outwardly formed part engages the surface of the ledge to resist movement of the pin away from the body.

According to a further aspect of the present invention, an artificial bait for fish comprises a body having a cylindrical cavity extending into the body from a surface of the body, and a hole extending laterally into the cavity, the junction of the hole with the cavity defining a ledge having a surface facing generally inwardly of the cavity, and a pin of resilient material formed with a closed loop at one end for releasably supporting a hook, the one end, at its extremity, having an outwardly formed part, the loop being resiliently received in the cavity such that the outwardly formed part engages the surface of the ledge to resist movement of the pin away from the body.

Preferably, the hole is formed by means of a truncated conical cutter, which during the forming operation, has its longitudinal axis parallel to the longitudinal axis of the cavity.

DESCRIPTION OF THE FIGURES OF THE DRAWING.

An embodiment of the invention will now be described, by way of example, reference being made to the Figure of the accompanying drawing in which.

Figure 1:
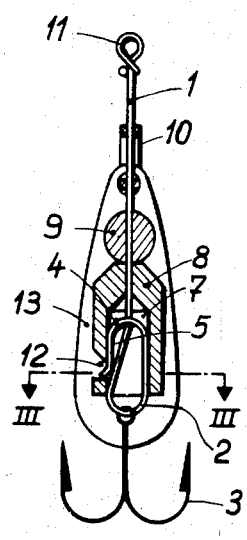
FIG. 1 is a longitudinal cross-section of an artificial bait according to the invention.
Figure 2:
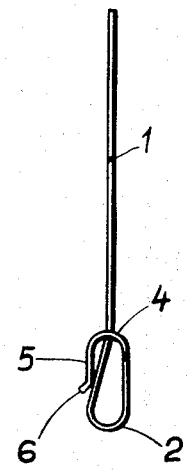
FIG. 2 is a side view of a pin, forming part of the bait of FIG. 1.

DESCRIPTION OF A PREFERRED EMBODIMENT.

As shown, an artificial bait of the spoon type, comprises a wire or pin 1 of resilient material folded back once on itself in order to form a first half-loop 2 for holding a hook 3, then a second time in order to form a second half-loop 4 in order to make an arm 5 in the direction of the hook 3. The end of the arm 5 at its extremity is bent out at an obtuse angle in order to form a tip portion 6 projecting outwardly of the loop. The resilient loop thus formed fits into a cylindrical cavity made in a body in the form of a sinker 8. The sinker 8 has, in its upper part, a hole 15 through which the upper end of the pin 1 passes. The pin 1 also passes through a bored olive lead weight 9 and a stirrup part 10 holding a spoon 13. In addition, the upper part of the pin 1 is folded back to form a fastening ring 11 for the line.

The wall of the sinker 8 defining the cavity 7 is formed with a hole 12, the junction of the hole 12 with the cavity 7 defining a ledge 14 having a surface facing generally upwardly of the cavity 7. The tip portion 6 engages this surface of the ledge and resists movement of a pin 1 away from the sinker 8. It will be seen that the loop 2, 4 in the pin or wire 1 extends around more than 360° so that the arm 5, the lower end 6 of which engages the ledge 14, is in compression when a pull is exerted by the hook 3 on the first half-loop 2. The second loop half 4 hence tends to open so as to lodge the end 6 still more firmly in the hole 12, but opening of the loop is restrained by confinement of the loop in the cavity 7 of the sinker 8. Hence secure anchorage of the loop in the cavity is assured.

Figure 3:
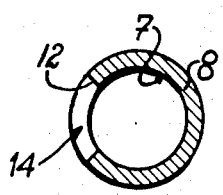
FIG. 3 is a cross-section on the III—III of FIG. 1.
Figure 4:
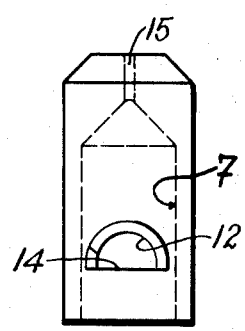
FIG. 4 is a side view of a sinker forming part of the bait of FIG.1.

As shown, the hole 12 has a geomoetric configuration enabling the lip 6 to be engaged or withdrawn. Hole 12 is made by boring the wall defining the cavity 7 with a truncated conical cutter the longitudinal axis of which is parallel to the axis of the cylindrical cavity 7 of the sinker 8. The hole 12 thus has the geometric configuration of the intersection of the trunk of a cone with a cylindrical wall, as can be seen in FIGS. 1, 3, and 4.

The placing and withdrawal of a hook 3 on the bait can be carried out easily without any tools. In fact, when the fisherman wishes to take off the hook 3, the tip portion 6 being engaged in the hole 12, it is only necessary by taking hold of the hook 3, to cause the pin 1 to rotate in relation to the sinker 8. This rotation causes the tip portion 6 to come out from hole 12 and it is only necessary to move the pin 1 outwardly from cavity 7 and then take off the hook 3 by making the ring of the hook slide along the pin 1. Having put a new fishing hook into place the pin 1 is again placed into cavity 7 and when tip portion 6 is put in front of hole 12 it enters therein owing to the resilience of the two half-loops 2 and 4. When a pulling force is exerted on hook 3 the loop thus formed has a tendency to open thus causing the locking of the pin 1 in the cavity 7.

What is claimed is:

1. An artificial bait for fish comprising a body having a downwardly opening cavity and a restricted hole entering the top of said cavity, a ledge formed in said cavity and having an upwardly facing surface extending part way around said cavity, and a resilient wire extending down into said cavity through said hole and forming a closed loop of more than 360° received in said cavity and comprising a lower loop-half for receiving a fish hook, an upper loop-half in the upper portion of said cavity and a downwardly extending end portion having its lower extremity engaging said ledge, a downward pull on said lower loop-half exerting a compressional force on said end portion tending to expand said loop and thereby pressing said end portion into secure engagement with said ledge.

2. An artificial bait for fish according to claim 1, wherein said end portion of said wire terminates in a tip portion bent out at an obtuse angle and engaging said ledge.

3. An artificial bait for fish according to claim 1, wherein said body is generally cylindrical and has an opening in one side opening into said cavity, a lower edge of said opening constituting said ledge.

4. An artificial bait for fish according to claim 3, wherein said opening is defined by a concave surface corresponding to a portion of the surface of a cone having an axis parallel to the axis of said cylindrical body and a flat surface corresponding to the base of said cone and constituting said ledge.

5. An artificial bait for fish according to claim 3, wherein said cavity is generally cylindrical with a wall that is smooth and uninterrupted except for said opening.

6. An artificial bait for fish comprising a body having a downwardly opening cylindrical cavity, a restricted hole entering the top of the cavity and an opening extending laterally into the cavity, the junction of said opening with the cavity defining a ledge having an upwardly facing surface extending part way around said cavity, a resilient wire extending down into said cavity through said hole and forming a closed loop of more than 360° received in said cavity and comprising a lower loop-half for receiving a fish hook, an upper loop-half in the upper portion of said cavity and a downwardly extending end portion having its lower extremity engaging said ledge, a downward pull on said lower loop-half exerting a compressional force on said end portion tending to expand said loop and thereby pressing said end portion into secure engagement with said ledge.

7. An artificial bait for fish according to claim 6, wherein said end portion of said wire comprises a substantially straight downwardly extending portion and a tip portion bent outwardly at an obtuse angle to said straight portion and engaging said ledge.

8. An artificial bait for fish according to claim 6, wherein said opening has a surface corresponding to the surface of a cone disposed with its axis parallel to the axis of said cylindrical cavity.

* * * * *